United States Patent [19]

Jung-Chao

[11] Patent Number: 4,579,142
[45] Date of Patent: Apr. 1, 1986

[54] SAFETY CONTROLLED VALVE FOR GAS CONTROLLER

[76] Inventor: Chuang Jung-Chao, No. 7, Alley 139, Lane 41 Shin Chuang, Tso Ying, Kaohsiung, Taiwan

[21] Appl. No.: 603,989

[22] Filed: Apr. 26, 1984

Related U.S. Application Data

[63] Continuation of Ser. No. 343,700, Jan. 28, 1982, abandoned.

[51] Int. Cl.⁴ .............................................. F16K 17/00
[52] U.S. Cl. .................................. 137/460; 137/519.5
[58] Field of Search .............................. 137/460, 519.5

[56] References Cited

U.S. PATENT DOCUMENTS

| | | | |
|---|---|---|---|
| 2,638,308 | 5/1953 | Kell | 137/519.5 |
| 3,326,233 | 6/1967 | Perruzzi | 137/460 |
| 3,381,707 | 5/1968 | Andersen | 137/460 X |
| 3,407,827 | 10/1968 | Follett | 137/460 X |
| 3,949,786 | 4/1976 | Houston | 137/460 |
| 3,977,430 | 8/1976 | Bushee | 137/460 |
| 4,188,971 | 2/1980 | Otteson | 137/460 |
| 4,223,692 | 9/1980 | Perry | 137/460 X |
| 4,257,448 | 3/1981 | Shiu | 137/460 |
| 4,373,548 | 2/1983 | Chou | 137/460 |

FOREIGN PATENT DOCUMENTS 2924533 1/1981 Fed. Rep. of Germany .
11268 of 1914 United Kingdom ............. 137/519.5

Primary Examiner—Harold W. Weakley
Attorney, Agent, or Firm—Balogh, Osann, Kramer, Dvorak, Genova, & Traub

[57] ABSTRACT

A gas safety controlled device attached to the inlet side of a conventional gas controller comprising a push button, push stem and ball valve. The ball valve is urged by high gas flow to close the gas controller inlet the gas controller outlet has overflow demand. The push button and associated push stem can be pushed downwardly on the ball valve to open the gas controller inlet.

1 Claim, 2 Drawing Figures

4,579,142

SAFETY CONTROLLED VALVE FOR GAS CONTROLLER

This application is a continuation, of application Ser. No. 343,700, filed Jan. 28, 1982, now abandoned.

BACKGROUND OF THE INVENTION

1. Field of the Invention

This invention relates to improvements in gas controllers, provided with a safety controlled valve device at the inlet side of the conventional gas controller to close automatically the gas inlet upon an overflow demand at the gas outlet. A push button device is provided in the controlled valve with an associated push stem to open the ball valve.

2. Description of the Prior Art

Conventional gas controllers, as widely known, usually use a safety valve or timer to control gas leakage or cut off the gas source when necessary. Many of these are not reliable and when the safety valve or timer system breakdown the controller may be damaged.

In view of the above-mentioned defects in conventional gas controllers, the applicant discloses below the improvements in a gas safety controlled device which comprise the instant invention.

OBJECT OF THE INVENTION

One object of the present invention is to provide an automatic ball valve to close the gas inlet when the gas controller is subject to overloads which could result in cracking or corrosion if gas flows out too rapidly from the gas tank.

Another object of the invention is to provide a safety valve which is urged automatically to close the gas inlet if the gas conduit or a joint should crack or be damaged.

Yet another object of the invention is to urge automatically a ball valve to close the gas inlet to avoid accident.

BRIEF DESCRIPTION OF THE DRAWINGS

The present invention will now be described in greater specificity with reference to the accompanying drawings in which.

DESCRIPTION OF THE PREFERRED EMBODIMENTS

Figure 1:
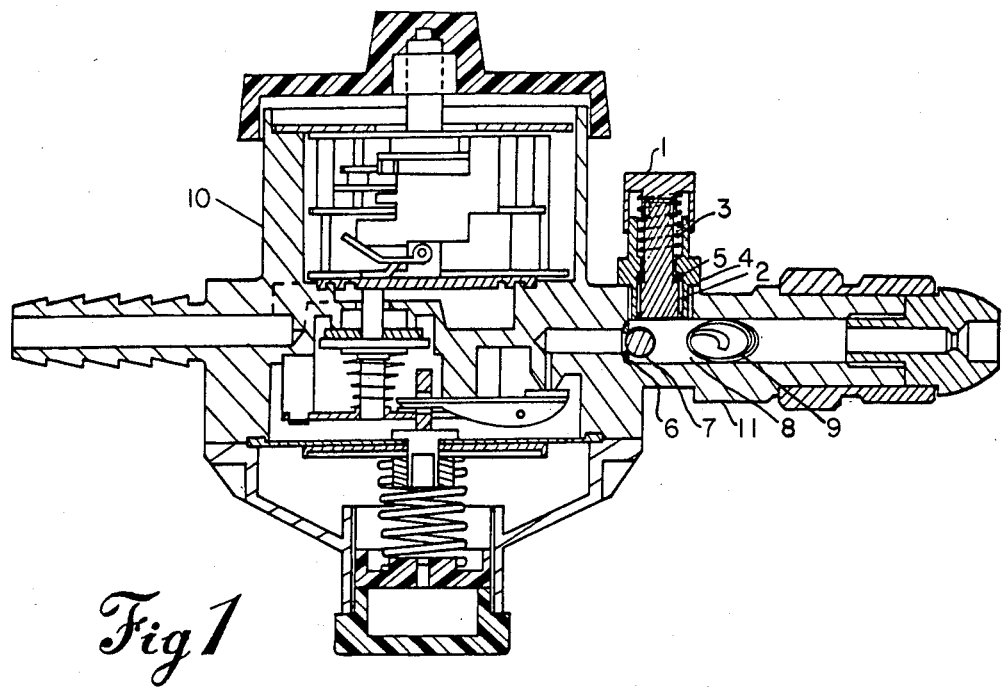
FIG. 1 is a cross-sectional view of the present invention as attached with a gas controller and the ball valve in the closed position.

As shown in the drawings, the present invention comprises a hollow cover button 1, push stem 2, and fixed body 4.

Figure 2:
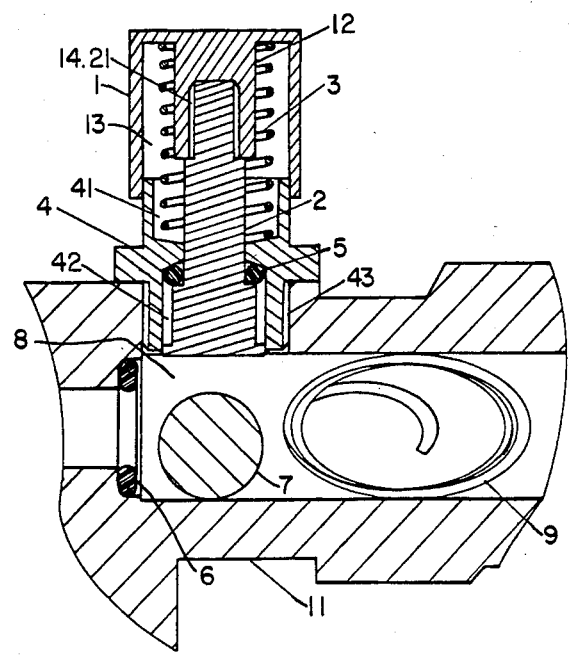
FIG. 2 is an enlarged partial cross-sectional view of the present invention with the ball valve in the open position.

Noting FIG. 2, the cover button 1 has an inwardly directed post 12 spaced from the inner wall forming an annular recess 13 for insertion thereinto of coil spring 3, said post 12 having an internal thread 14 which engages external thread 21 on the upper end of the push stem 2. A control portion of stem 2 has a smaller diameter than the lower portion, and smaller diameter portion allows the insertion of the seal ring 5 between it and the upper end of the recess 42 of the fixed body 4 in order to prevent gas leakage, the seal ring having a slightly larger diameter than the recess.

The fixed body 4 is provided in the top and bottom portion with cavity 41, 42 respectively, for insertion thereinto of coil spring 3, the lower end of push stem 2, and seal ring 5. Furthermore, said fixed body 4 has an external thread 43 at the peripheral surface of the bottom portion engageable with an internal threaded bore in the gas controller 10.

In the flow channel of gas inlet 11 (i.e. high pressure side) is inserted a ball valve 7 and coil spring 9 to limit the movement of the ball valve 7 upstream. A seal ring 6 is provided in the flow channel downstream of the ball valve 7 to function as a valve seat for ball 7 to prevent gas leakage through the gas controller 10 when the ball valve 7 is in the closed position. The seal ring defines an opening in the flow channel of the gas inlet a predetermined distance above the inner surface of the flow channel are shown in FIG. 2, thereby requiring an effort on the part of the ball member to seat itself in the opening.

In normal flow condition, as shown in FIG. 2, the ball valve 7 will be open by means of its gravity weight. However, when the gas outlet side has a demand for excess gas flow (i.e. more than design flow or leakage), the gas from the tank will flow out rapidly through the inlet side 11 resulting in urging the ball valve 7 by flow velocity to move forwardly into the seal ring 6 and holding the ball valve 7 in closed position. If it is desired to open the ball valve, depressing cover button 1 will move the push stem 2 downwardly to engage and urge the ball valve 7 into the open position. Coil spring 3 will return the cover button 1 and associated push stem 2 to the raised position upon release.

I claim:

1. In a gas controller having a casing, an inlet, a flow channel in the inlet connected to a gas supply, an outlet, and a safety valve to prevent overflow through the controller, the improvement in a safety valve comprising, a ball member in the inlet flow channel rollingly supported on an inner horizontal surface of said flow channel, a seal ring in said inlet flow channel downstream of said gas supply and defining an entry into said outlet to cooperatively engage said ball member to serve as a valve seat therefor to form a check valve, said seal ring defining an opening a predetermined distance above said inner horizontal surface of said flow channel, said inlet flow channel, said seal ring, and said outlet having a central horizontal axis, said ball member having a horizontal axis parallel to said central axis, the horizontal axis of said ball member being disposed below said central axis thereby requiring an effort on the part of the ball member to seat itself, a spring member upstream of said ball member to define a limited range for the free movement of said ball member in proximity to said seat and provide sufficient space for said ball member to fall out of engagement with said valve seat by its own weight with normal flow through said inlet flow channel, a threaded bore through said casing inlet adjacent said valve seat, said threaded bore extending vertically through said casing and perpendicularly to said horizontal surface of the flow channel, a push button mounting member having threaded inner end cooperatively engageable with said threaded bore to be fixedly mounted therein, said inner end of said mounting member being provided with a chamber having are reduced truncated conical wall, said inner end having a bore through said mounting member extending substantially at right angles to the central axis of said valve seat, a push button slidably engaging the outer end of said mounting member, a push button stem slidably mounted within said bore of said mounting member attached at the outer end to said push button, said push button stem having an inner end provided with a circular flange, engageable, when depressed by said push button, with said ball member when in the closed position, a push button seal snugly disposed between said inner end of the mounting member and said push button stem, said push button seal being disposed between said flange and said conical wall of the mounting member to prevent escape of gas through said mounting member, a return spring means operatively mounted between said mounting member and said push button to resiliently urge said push button and said stem outwardly with respect to said flow channel.

* * * * *